UNITED STATES PATENT OFFICE.

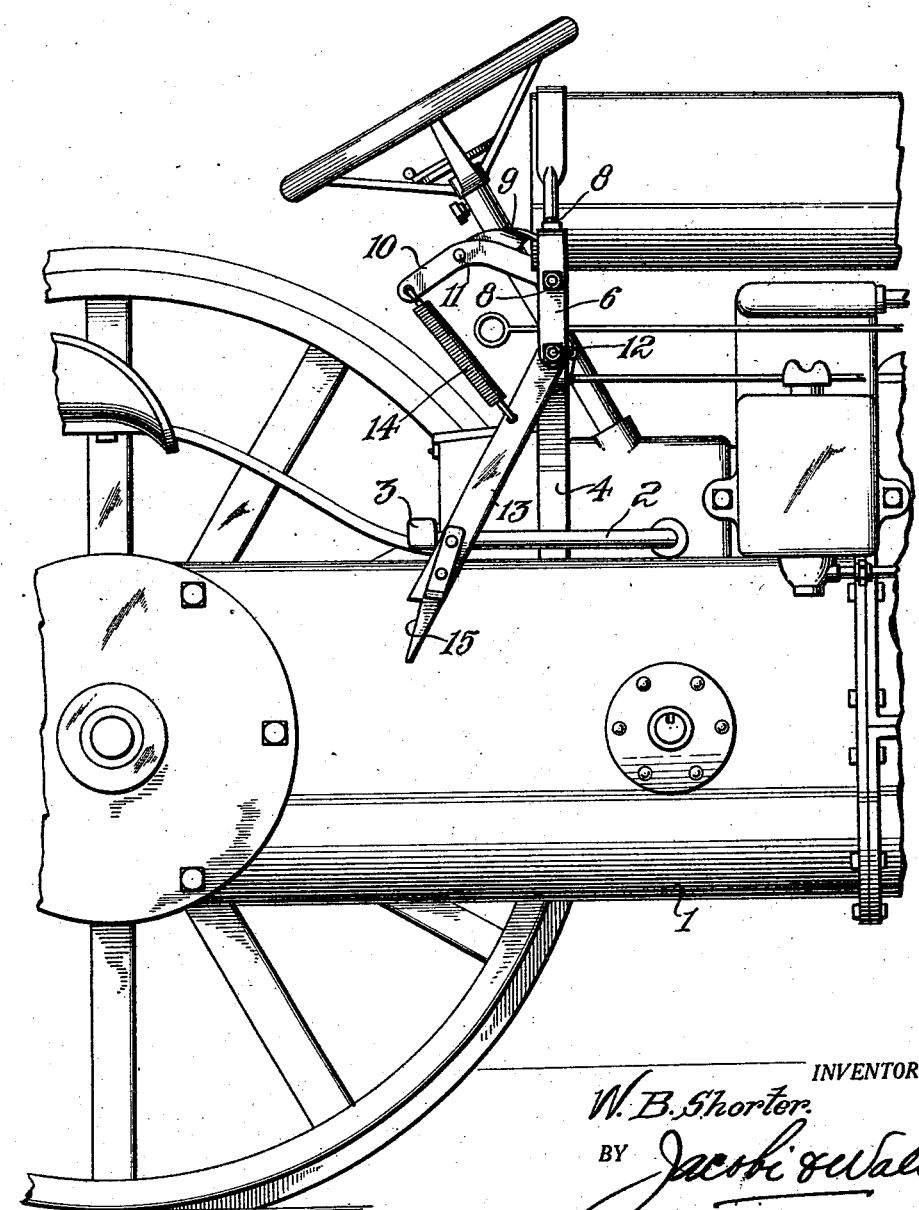

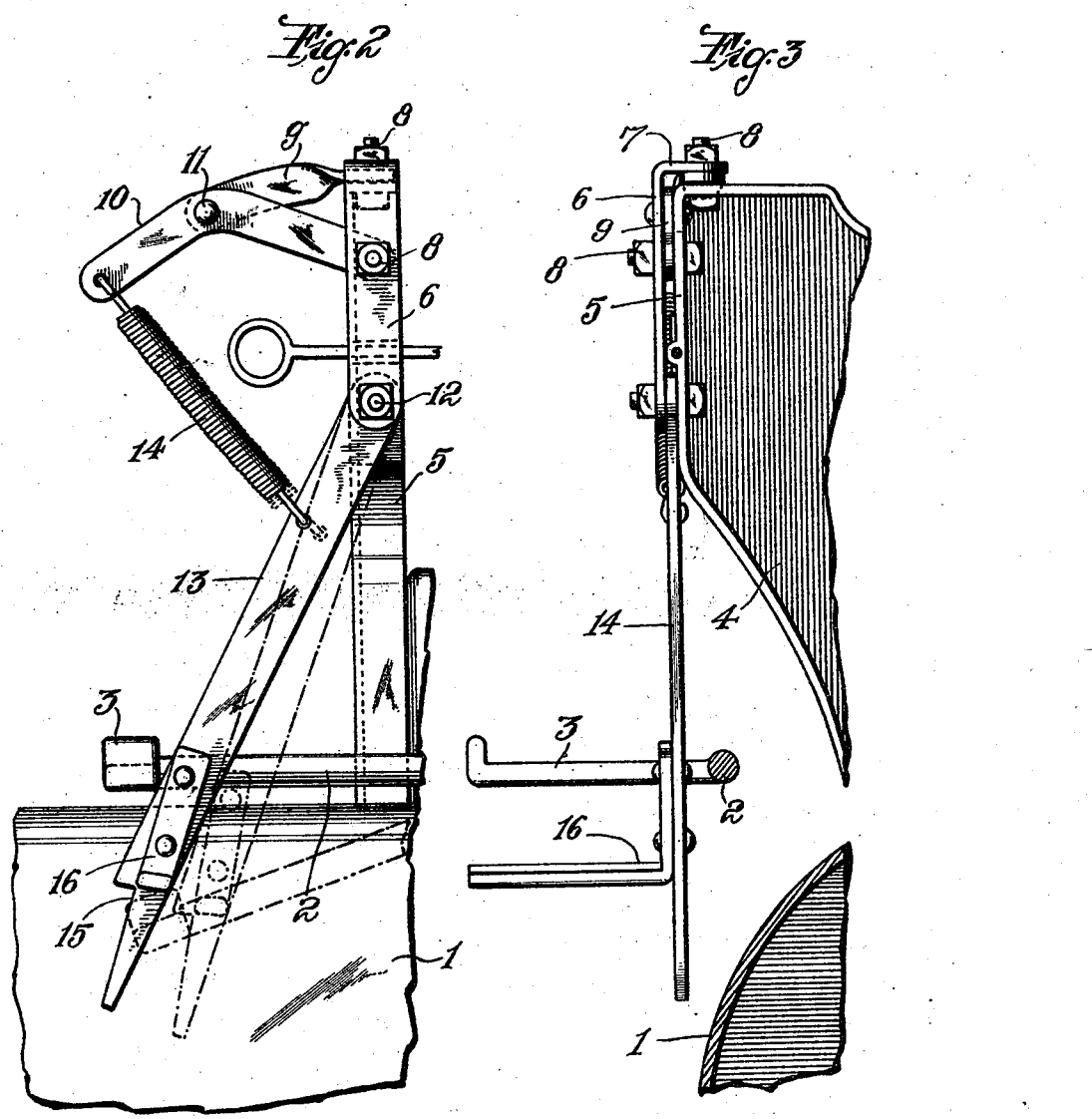

WILY B. SHORTER, OF FREEDOM, OKLAHOMA, ASSIGNOR TO ERNEST G. EVANS, OF HILLSDALE, OKLAHOMA.

CLUTCH CONTROL FOR FORDSON TRACTORS.

1,416,893.   Specification of Letters Patent.   Patented May 23, 1922.

Application filed March 23, 1920. Serial No. 368,013.

*To all whom it may concern:*

Be it known that I, WILY B. SHORTER, a citizen of the United States, residing at Freedom, in the county of Woods and State of Oklahoma, have invented certain new and useful Improvements in Clutch Controls for Fordson Tractors, of which the following is a specification.

This invention relates to new and useful improvements in clutch mechanisms and more particularly to a clutch control and the primary object of the invention is to provide a clutch control applicable especially to tractors of the Fordson type.

A further object of the invention resides in providing a device which is operable with the clutch lever and which may be engaged with said lever, when desired, for holding said clutch in its ineffective position.

Still another object of the invention resides in providing a device consisting of few and simple parts quickly and readily applied to any such tractors in use.

With these and other objects in view my invention consists in the novel features of construction, combination and arrangement of parts as will be hereinafter referred to and more particularly pointed out in the specification and claim.

Referring to the drawings in which similar reference characters designate corresponding parts throughout the several views, Figure 1 is a side elevation of a tractor showing my improved clutch control applied to use thereon;

Figure 2 is an enlarged side elevation of my invention as applied, showing in dotted lines the position of the control when holding the clutch lever in its ineffective position; and Figure 3 is a front elevation of the same.

In describing the invention I shall refer to the drawings in which similar reference characters designate corresponding parts throughout the several views and wherein 1 designates a tractor of the well-known Fordson type provided with the usual clutch lever 2 the end of which is provided with an angular foot pedal 3. In the drawings I have also shown the usual dash 4 which has a flange 5 thereon.

In the normal position of the lever 2, as shown in Figure 1 of the drawing, the clutch of the tractor is in its effective or engaging position and is referred to by the mechanic and autoist as being "in." My invention contemplates the provision of a device for more or less controlling the lever 2 so as to normally force said lever to its effective or engaging position and, when desired, to hold said lever in such a position as to retain the clutch in its disengaged position, or what is known to the mechanic or autoist as "out."

To this end I provide a bar 6 the upper portion of which is bent angularly as shown at 7 and said bar is bolted intermediate of its ends and at its angular portion with the flange 5 of the dash 4 as shown at 8. Secured to the angular portion 7 of said bar by the bolt engaged with the flange 5 is a twisted bar or arm 9 which extends rearwardly of the dash and is curved somewhat downwardly. This arm 9 forms a bracing member for an additional arm 10, the latter being secured at its forward end to the bolt 8 securing the bar 6 to the flange 5. This arm 10 extends rearwardly, of course, and is somewhat arcuately designed being riveted or otherwise secured as at 11 to the rear end of the arm 9.

Pivotally secured to the lower end of the bar 6 from a bolt designated in the drawings as 12 is a lever 13 which suspends to a plane below the horizontal plane of the normal position of the clutch lever 2. This lever 13 is positioned just forwardly of the foot pedal 3 and a coil spring 14 is provided having one end engaged with the rear end of the arm 10 and one end engaged with said lever 13 whereby to normally retain said lever in a position in engagement with the forward edge of the foot pedal 3. The lower end of said lever 13 is cut away or notched as shown at 15 and secured to the lever just above the notched portion is an angular member 16 forming a foot piece or pedal thereon.

As shown the normal position of the lever 13 is against the pedal 3, holding the latter in its position to retain the clutch in engaged position and upon the downward movement of said lever 2 to a position as shown in dotted lines in Figure 2 the lever 13 will be forced forwardly against the tension of the spring 14 and if desired, the foot pedal 3 may be engaged with the notch 15. When so engaged the lever 2 will be held in its downward position and the clutch held "out" or disengaged. When it is desired to release the lever 2 from its downward position to permit the clutch to be engaged, it is only necessary for the operator of the tractor to place his foot on the foot piece or pedal 16 of the lever 13 and force same forwardly, thereby releasing the notch 15 from its engagement with the foot pedal 3.

It will be seen that I have provided a device which is simple and inexpensive to manufacture, readily and quickly applied to any tractor of the Fordson type and one which may be operated with the same foot (the right) that operates the clutch lever.

It will also be seen that I have provided a clutch control which is a valuable asset to tractors and which is extremely efficient in operation.

What I claim is:—

A clutch controlling attachment for tractors, comprising a supporting bracket removably secured to the dash board of the tractor and including a portion which projects laterally and rearwardly toward the driver; a depending lever pivoted at its upper end to the bracket and having a notch in its free lower end, said lever being disposed in substantially the same vertical plane as the lateral portion of said bracket, a foot-operated clutch lever having a portion extending laterally across the depending lever at a point above said notch, but engageable in the notch when depressed so as to be retained thereby in depressed position; a spring connection between the depending lever and the lateral portion of the bracket tending to pull said lever in an upward direction so as to hold it against the clutch lever at all times; and a pedal secured to the lower portion of said depending lever for depressing the same to disengage its notch from the clutch lever.

In testimony whereof I affix my signature.

WILY B. SHORTER.